Sept. 4, 1962   G. FISCHER   3,052,421
DIFFERENTIAL BIDIRECTIONAL DRAG

Filed Sept. 4, 1959 — 2 Sheets-Sheet 1

Inventor:
Georg Fischer

Sept. 4, 1962     G. FISCHER     3,052,421
DIFFERENTIAL BIDIRECTIONAL DRAG
Filed Sept. 4, 1959     2 Sheets—Sheet 2

INVENTOR
Georg Fischer

BY *George H Spencer*

ATTORNEY 3,052,421
DIFFERENTIAL BIDIRECTIONAL DRAG
Georg Fischer, Wedel, Holstein, Germany, assignor to Telefunken G.m.b.H., Berlin, Germany
Filed Sept. 4, 1959, Ser. No. 838,336
Claims priority, application Germany Sept. 5, 1958
5 Claims. (Cl. 242—55.12)

The present invention relates to braking means for applying a drag in one rotational direction which differs from the amount of drag applied in the other rotational direction, hereinafter referred to as the drag ratio, said brake serving, for example, in the drive mechanism in magnetic tape recording and/or reproducing apparatus.

In such magnetic tape recording or reproducing apparatus, it is necessary that, during braking of the magnetic tape from full speed to stop, a greater drag be applied to the feeding reel than to the take-up reel, in order to avoid tape tensioning transients or the throwing of loops.

Therefore, the brakes of the drive mechanism in a tape recording or reproducing apparatus are provided in such a manner, that they have a predetermined drag ratio rather than only a predetermined braking moment, whereby under drag ratio there is to be understood the ratio of the brake moment effective during braking from right run to the brake moment effective during braking from left run. The brake moment is primarily dependent on the design of the brake and on the pressure produced by a spring, while the drag ratio is determined by the design only.

It is desirable to vary the brake moment within small limits, because frequently substances of mineral base are used as the brake lining, wherein the friction varies and may change, for example, also in case of an overload, due to carbonization of the friction surface. If the force of the spring acting on the brake is adjustable, the change in the force results in a simultaneous change in the braking moment acting for the right and left runs of the braking shaft, whereby the drag ratio remains unchanged.

It is an object of the present invention to overcome this disadvantage.

It is another object of the invention to make the braking moments acting in each rotational direction of the shaft adjustable independently of one another by mounting the brake disc rotatably on the shaft to be braked and connecting it with this shaft via a friction clutch having stronger braking action in the rotational direction.

It is a further object of the invention to provide a brake with a braking action which is variable by adjustment of a spring tension. By providing two spring forces which are independently adjustable and independently acting, the drag ratio is made adjustable without further structural change in the braking device.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figures 1, 2:
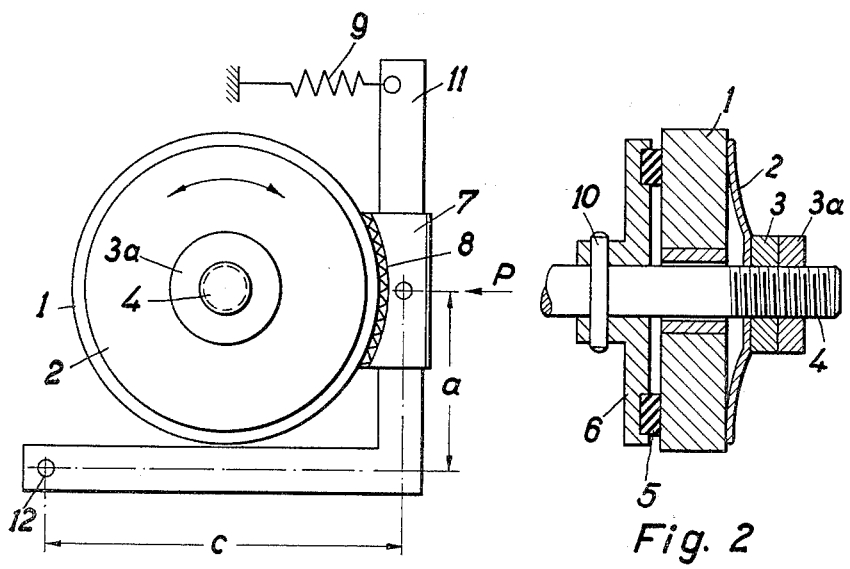
FIGURE 1 shows schematically a side view of an embodiment of the braking device according to the invention.
FIGURE 2 shows a section through the braking device of FIGURE 1.

A brake disc or plate 1, for example of graphite, is rotatably mounted on a shaft 4 to be braked. A brake lever 11 supporting a brake shoe 7 is adapted to act on the peripheral surface of the disc 1. This brake shoe 7 has a brake lining 8. The brake lever 11 is part of an elbow lever comprising two arms $a$ and $c$, said elbow lever being rotatably mounted at 12. The drag ratio of such brake is derived from the ratio of the arm $a$ to the arm $c$ according to the formula:

$$P_u = \frac{P}{\frac{1}{\mu} \pm \frac{c}{a}}$$

wherein $P_u$ is the circumferential or peripheral force applied to the brake disc 1, P is the pressure force of the brake shoe 7, $\mu$ is the friction coefficient of the brake lining 8, $a$ and $c$ are the lengths of the arms of the elbow brake lever 11. The formula shows that the circumferential or peripheral force $P_u$ is larger in case of counterclockwise run of the shaft or disc 1 to be braked, while it is smaller in case of clockwise run.

In accordance with this invention, the brake disc 1 is loosely mounted on the shaft 4 to be braked and is coupled with the latter via a friction clutch having an adjustable coupling force. For this purpose a disc 6, for example of steel, is secured to the shaft 4 by means of a pin 10, the side of said disc 6 being provided with a friction lining 5, having a low friction coefficient. A spring 2, the tension of which can be varied by means of adjustable nuts 3 and 3a, presses the brake disc 1 on the brake lining 5. The brake disc 1 is suitably made of graphite and the friction lining 5 is suitably made of felt. The length of the arm $c$ of the brake lever 11 is large with respect to the effective length of the arm $a$ in order to obtain a large drag ratio.

When the brake runs clockwise, the shoe brake is pushed away from the disc 1, i.e. the friction is so weak that the brake disc 1 is taken along by the friction clutch. The braking moment can be adjusted by means of a spring 9 attached to the free end of the elbow lever 11; this may be accomplished as illustrated, for instance, in FIGURE 3 in which the spring 9 is shown as being attached to a screw 9a threaded in a support 9b so that the spring force can be varied simply by turning screw 9a.

When the braking device runs counterclockwise, the braking disc 1 is virtually locked by the brake shoe 7, i.e. the friction is so great that the friction clutch 1—5—6 slips. The brake action on the shaft 4 is dependent upon the pressure of the spring 2.

Thus, according to the invention the braking moments acting for clockwise and for counterclockwise rotations are variably independent of one another, without changing the structural design of the braking mechanism. As a result of this, differences in the frictional value can be adjusted during the manufacture or later in such a manner that the required drag ratio is maintained.

The two shafts driving the reels of the tape recording or reproducing apparatus are equipped with brakes according to the invention. The brake shown in FIGURES 1 and 2 is, for example, used for a tape running from left to right with the feeding reel rotating counterclockwise. In this case, a brake will be provided on the shaft of the reel serving as a takeup reel, the lever system of said brake being oppositely disposed with respect to the lever system shown in FIGURE 1.

The braking lever with the brake shoe as shown in the drawings can be replaced by any other suitable brake means, e.g. by a band brake.

Figure 3:
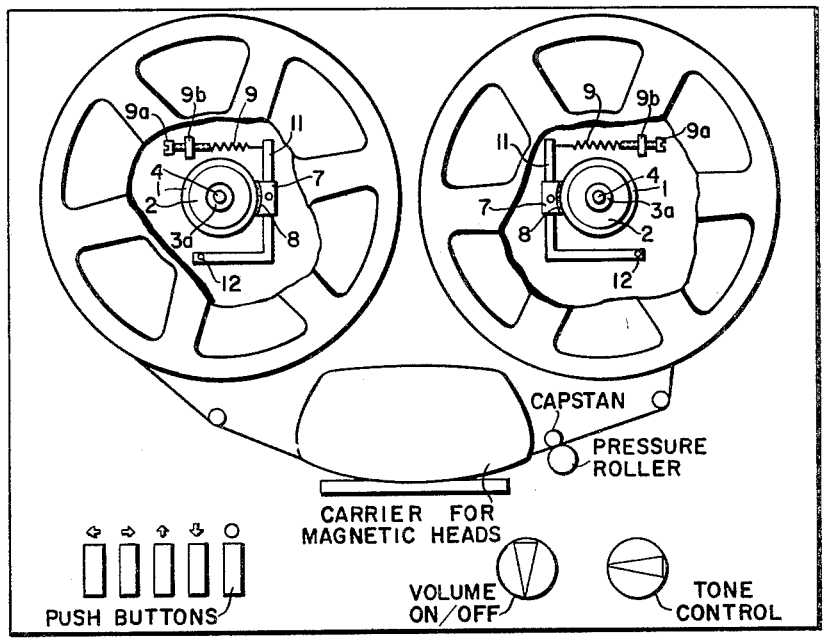
FIGURE 3 shows a tape recorder incorporating two brake devices according to the present invention, the two brake devices being associated with the two reel shafts, respectively.

FIGURE 3 is a plan view showing the usual component parts of a conventional tape recorder. For the sake of simplicity, these conventional parts are identified by appropriate legends, with the elements of the brake devices according to the present invention being identified by reference numerals. FIGURE 3 shows the two reel shafts, each of which has one of the two brake devices associated with it, with the two brake devices being oppositely disposed relatively to each other. Which of the two shafts 4 is at any one time the take-up reel shaft or the feeding reel shaft will, of course, depend on the direction of travel of the tape, i.e., either "forward" or "rewind."

I claim:

1. A shaft brake device, comprising, in combination: a brake disk freely journalled on the shaft; clutch means for yieldably coupling said disk to the shaft and including first adjusting means for adjusting the force with which said clutch means couples said disk to the shaft; and braking means for applying to said disk a greater amount of drag when said disk rotates in one direction than when said disk rotates in the opposite direction, said braking means including second adjusting means for adjusting the force with which said braking means acts on said disk, whereby the braking moments effective in each rotational direction may be adjusted independently of one another such that when said disk rotates in said one direction said clutch means will slip and that when said disk rotates in said opposite direction said braking means will slip, thereby allowing the drag ratio to be varied.

2. A shaft brake device as defined in claim 1 wherein said first adjusting means comprise an adjustable spring device.

3. A shaft brake device as defined in claim 1 wherein said clutch means comprise a second disk keyed to the shaft and a frictional lining between said disks, and wherein said first adjusting means comprise an adjustable spring device for urging said disks toward each other.

4. A shaft brake device as defined in claim 1 wherein said second adjusting means comprise an adjustable spring device.

5. A tape recorder having a take-up reel shaft and a feeding reel shaft, two shaft brake devices each as defined in claim 1, said two shaft brake devices being associated with said take-up and feeding reel shafts, respectively, and being oppositely disposed relative to each other.

References Cited in the file of this patent
UNITED STATES PATENTS

| | | |
|---|---|---|
| 444,789 | Wyman | Jan. 13, 1891 |
| 834,021 | Pentecost | Oct. 23, 1906 |
| 1,813,275 | Burdick | July 7, 1931 |
| 2,652,910 | Godeck | Sept. 22, 1953 |
| 2,686,637 | Dashiell et al. | Aug. 17, 1954 |